(12) United States Patent
Patfield

(10) Patent No.: US 7,729,339 B2  
(45) Date of Patent: Jun. 1, 2010

(54) AUDIO WATERMARKING FOR CALL IDENTIFICATION IN A TELECOMMUNICATIONS NETWORK

(75) Inventor: Kevin M. Patfield, Phoenix, AZ (US)

(73) Assignee: Alcatel-Lucent USA Inc., Murray Hills, NJ (US)

( * ) Notice: Subject to any disclaimer, the term of this patent is extended or adjusted under 35 U.S.C. 154(b) by 1884 days.

(21) Appl. No.: 10/632,196

(22) Filed: Jul. 31, 2003

(65) Prior Publication Data

US 2005/0025126 A1 Feb. 3, 2005

(51) Int. Cl.
*H04L 12/66* (2006.01)

(52) U.S. Cl. ....................................... 370/352

(58) Field of Classification Search ................. 370/352, 370/351, 359, 379, 353, 355

See application file for complete search history.

(56) References Cited

U.S. PATENT DOCUMENTS

| | | | | |
|---|---|---|---|---|
| 6,108,705 | A * | 8/2000 | Svennevik et al. | 709/227 |
| 6,775,277 | B1 * | 8/2004 | Li et al. | 370/389 |
| 6,832,254 | B1 * | 12/2004 | Scoggins et al. | 709/227 |
| 6,977,922 | B2 * | 12/2005 | Blanset et al. | 370/352 |
| 6,985,492 | B1 * | 1/2006 | Thi et al. | 370/429 |
| 7,023,868 | B2 * | 4/2006 | Rabenko et al. | 370/419 |
| 7,068,759 | B2 * | 6/2006 | Dammrose | 379/32.03 |
| 7,216,350 | B2 * | 5/2007 | Martin et al. | 719/315 |
| 7,286,521 | B1 * | 10/2007 | Jackson et al. | 370/352 |
| 2002/0115432 | A1 * | 8/2002 | Roeder | 455/415 |
| 2004/0022237 | A1 * | 2/2004 | Elliott et al. | 370/356 |
| 2004/0037270 | A1 * | 2/2004 | Mercuriali et al. | 370/352 |
| 2004/0190498 | A1 * | 9/2004 | Kallio et al. | 370/352 |
| 2004/0264455 | A1 * | 12/2004 | Tao | 370/389 |
| 2008/0044087 | A1 * | 2/2008 | Levy et al. | 382/232 |
| 2008/0052783 | A1 * | 2/2008 | Levy | 726/26 |

* cited by examiner

*Primary Examiner*—Chi H Pham
*Assistant Examiner*—Mohammad S Adhami
(74) *Attorney, Agent, or Firm*—Fay Sharpe LLP

(57) ABSTRACT

A method of processing half-calls each having opposing first and second ends is provided within a telecommunications network. Each of the half-calls is either an originating half-call terminated at the first end thereof by calling consumer premises equipment (CPE) or a terminating half-call terminated at the first end thereof by called CPE, wherein an associated pair of half-calls connected at their second ends including both an originating and terminating half-call completes a call connecting the CPE terminating the respective first ends of the half-calls that form the pair. The method includes: applying identifiers to originating half-calls such that the originating half-calls are distinctly identifiable thereby with respect to one another, the identifiers thereafter accompanying terminating half-calls that form associated pairs of half-calls together with the originating half-calls to which the identifiers were applied; and, examining terminating half-calls to detect the identifiers such that upon detection of the identifiers the terminating half-calls accompanying the detected identifiers and the originating half-calls to which the identifier were applied are recognized as associated pairs of half-calls.

20 Claims, 3 Drawing Sheets

AUDIO WATERMARKING FOR CALL IDENTIFICATION IN A TELECOMMUNICATIONS NETWORK

FIELD

The present inventive subject matter relates to the telecommunication arts. Particular application is found in conjunction with Internet Protocol (IP) telephony, and the specification makes particular reference thereto. However, it is to be appreciated that aspects of the present inventive subject matter are also amenable to other like applications.

BACKGROUND

It is a common practice to use packet-switched networks, such as IP networks, to connect calls (e.g., voice, data or multimedia calls) between end users. For example, Voice over IP (VoIP) has been developed to permit Consumer Premises Equipment (CPE), such as IP telephones, to be connected over an IP network so that end users may exchange voice communications via the connected CPE. Moreover, IP gateways have been developed that bridge IP networks with the Public Switch Telephone Network (PSTN), a circuit-switched network as opposed to a packet-switched network. That is to say, an IP gateway acts as a point of entry for IP calls into the PSTN, e.g., via a telephone switch such as a class 5 switch, and vice versa for calls from the PSTN into the IP network.

Commonly, IP gateways take advantage of the class 5 switch's features to perform call processing, e.g., routing calls. With reference to FIG. 1, when a VoIP call is placed from an IP telephone 10 (i.e., the calling party), the call is routed over an IP network 12 and through an IP gateway 14 where it enters the PSTN 20, e.g., via a class 5 switch 22. This represents a first half-call as it is sometimes referred to in the art, indicated by arrow 30. The class 5 switch 22 then routes the call to the intended recipient. While generally the call may in practice be intended for any CPE (including those accessible through the PSTN 20), for the purposes of this example, the intended recipient of the call is another IP telephone 40 (i.e., the called party). Accordingly, to connect the call, it is routed back through the IP gateway 14 across the IP network 12 to the IP telephone 40. This represents a second half-call, indicated by arrow 32, that along with the associated first half-call 30 completes the connection between the CPE, i.e., the IP telephones 10 and 40.

With respect to the call in the aforementioned example, certain potential limitations, drawbacks and/or problems are revealed. For example, resources of the switch 22 have to be utilized to maintain support of the call for the duration of its connection through the switch 22. Similarly, resources of the IP gateway 14 also have to be continually utilized (i.e., during the calls duration) to convert and/or translate a packet-switched call to a circuit-switched call (for the first half-call 30) and then ultimately to convert and/or translate the circuit-switched call back into a packet-switched call (for the second half-call 32). Accordingly, in such instances, it may at times be deemed advantageous to free the switch 22 from the burden of supporting the call. It may at times also be deemed advantageous to reduce the conversion/translation load carried by the IP gateway 14, thereby relieving some of the burden thereon.

Accordingly, a new and improved system, gateway and/or technique is disclosed that overcomes the above-referenced problems and others.

SUMMARY

In accordance with one preferred embodiment, a method of processing half-calls each having opposing first and second ends is provided within a telecommunications network. Each of the half-calls is one of an originating half-call terminated at the first end thereof by calling consumer premises equipment and a terminating half-call terminated at the first end thereof by called consumer premises equipment, wherein an associated pair of half-calls connected at their second ends including both an originating and terminating half-call completes a call connecting the consumer premises equipment terminating the respective first ends of the half-calls that form the pair. The method includes: (a) applying identifiers to originating half-calls such that the originating half-calls are distinctly identifiable thereby with respect to one another, the identifiers thereafter accompanying terminating half-calls that form associated pairs of half-calls together with the originating half-calls to which the identifiers were applied; and, (b) examining terminating half-calls to detect the identifiers such that upon detection of the identifiers the terminating half-calls accompanying the detected identifiers and the originating half-calls to which the identifier were applied are recognized as associated pairs of half-calls.

In accordance with another preferred embodiment, a call processing apparatus for processing half-calls each having opposing first and second ends is provided within a telecommunications network. Each of said half-calls is either an originating half-call terminated at the first end thereof by calling consumer premises equipment or a terminating half-call terminated at the first end thereof by called consumer premises equipment, wherein an associated pair of half-calls connected at their second ends including both an originating and terminating half-call completes a call connecting the consumer premises equipment terminating the respective first ends of the half-calls that form the pair. The call processing apparatus includes: application means for applying identifiers to originating half-calls such that the originating half-calls are distinctly identifiable thereby with respect to one another, the identifiers thereafter accompanying terminating half-calls that form associated pairs of half-calls together with the originating half-calls to which the identifiers were applied; and, examination means for examining terminating half-calls to detect the identifiers such that upon detection of the identifiers the terminating half-calls accompanying the detected identifiers and the originating half-calls to which the identifier were applied are recognized as associated pairs of half-calls.

In accordance with yet another preferred embodiment, a gateway is provided in a telecommunications network including a packet-switched network and a circuit-switched network. The gateway bridges the packet-switched and circuit-switched networks with one another by selectively converting packet-switched calls into circuit-switched calls and vice versa depending on a direction of traffic flow over the gateway. The gateway includes: an audio watermark generator that applies identifiers to a first leg of calls routed through the gateway, the identifiers distinctly identifying the respective calls to which they are applied from one another; and, an audio watermark sensor that examines a second leg of calls routed through the gateway to detect for identifiers.

Numerous advantages and benefits of the inventive subject matter disclosed herein will become apparent to those of ordinary skill in the art upon reading and understanding the present specification.

BRIEF DESCRIPTION OF THE DRAWINGS

Preferred embodiments may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional network elements, entities and/or facilities, relevant communications standards, protocols and/or services, and other components that are commonly known in the telecommunications art without further detailed explanation as to their configuration or operation except to the extent they have been modified or altered in accordance with and/or to accommodate the preferred embodiment(s) presented.

Figure 1:
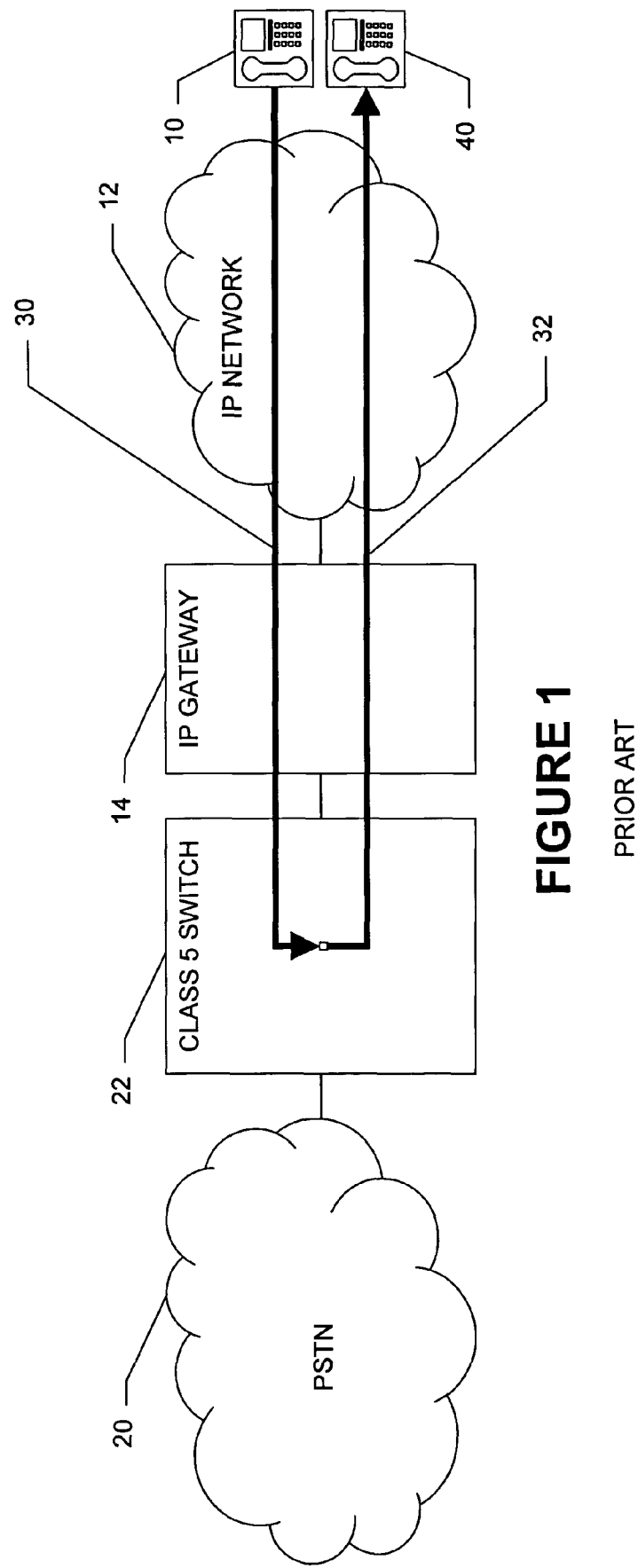
FIG. 1 is a block diagram showing a conventional telecommunications system employing a VoIP gateway.
Figure 2:
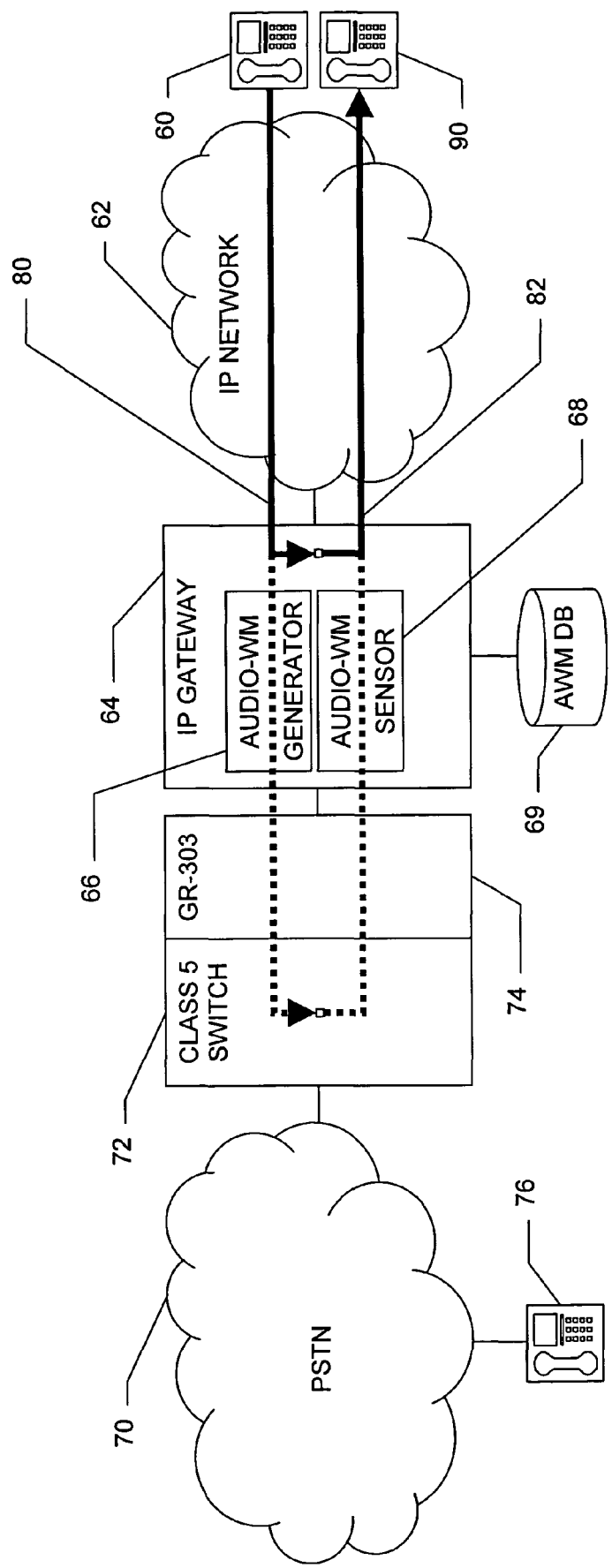
FIG. 2 is a block diagram showing a telecommunications system including an IP gateway in accordance with an exemplary embodiment thereof.

With reference to FIG. 2, an exemplary telecommunications system is illustrated in accordance with a preferred embodiment. The operation of the system shall be described by way of an exemplary IP call initiated from calling CPE 60 to called CPE 90. For illustrative purposes, CPE 60 and 90 are shown as IP telephones, e.g., involved in a VoIP call. However, it is to be appreciated that the CPE 60 and 90 may be any appropriate type of CPE as is known in the art for conducting various types of IP or packet-switch calls, e.g., voice, data, multimedia, etc. Further, it is to be appreciated that while only one particular call between a pair of CPE (i.e., the calling and called CPE 60 and 90) is shown, a plurality of such calls are similarly being handled simultaneously between a plurality of likewise situated calling and called CPE.

As shown, the CPE 60 and 90 are operatively connected to an IP network 62, or another like packet-switched network, so that end users employing the same may exchange communications with one another. An IP gateway 64 bridges the IP network 62 with the PSTN 70. That is to say, the IP gateway 64 acts as a point of entry for packet-switched calls from the IP network 62 headed into the PSTN 70, and similarly acts as a point of entry for circuit-switched calls from the PSTN 70 headed into the IP network 62. In the usual manner, the IP gateway 64 selectively converts and/or translates packet-switched calls into circuit-switched calls and vice versa depending on the direction of traffic flow.

Suitably, a class 5 switch 72, or other suitable circuit-switched telecommunications switch, on the PSTN side of the IP gateway 64 interfaces with the IP gateway 64, e.g., via a GR-303 interface 74, or another like interface such as a V.5.2 interface. Use of the GR-303 interface 74, the V.5.2 interface or the like, is advantageous insomuch as from the perspective of the switch 72 the IP gateway 64 acts and/or otherwise appears as a remote digital terminal (RDT) while continuing to appear from the IP side as a gateway into the PSTN 70. The switch 72 is responsible for call routing and optionally provides other call processing and/or call features normally associated therewith.

For example, when a call is placed from the calling CPE 60, the call is routed over the IP network 62 to the IP gateway 64 where it is translated from a packet-switched call to a circuit-switched call. The call then enters the PSTN 70 via the switch 72 (which may be considered part of the PSTN 70). This represents a first leg of the complete call or an originating half-call (indicated by the combination solid/dashed arrow 80).

The switch 72 then routes the call to the intended recipient. Accordingly, in this example, the call is routed, again via the GR-303 interface 74, back to the IP gateway 64 where the circuit-switched call is translated back into a packet-switched call. Finally, the call is directed over the IP network 62 to the CPE 90. This represents a second leg of the complete call or a terminating half-call (indicated by the combination solid/dashed arrow 82) that along with the associated originating half-call 80 completes the connection between the CPE 60 and 90.

Suitably, the IP gateway 64 includes an Audio WaterMark (AWM) generator 66 and an AWM sensor 68. The AWM generator 66 operates on half-calls passing through the gateway 64 from the IP network 62 to the PSTN 70, e.g., in this case the first or originating half-call 80, and the AWM sensor 68 operates on half-calls passing through the gateway 64 from the PSTN 70 to the IP network 62, e.g., in this case the second or terminating half-call 82.

More specifically, when the originating half-call 80 reaches the gateway 64, the AWM generator 66 generates and applies an AWM thereto that uniquely identifies the originating half-call 80. Suitably, the AWM is an encoded signal, e.g., superimposed on the traffic of the originating half-call 80, that is substantially unperceivable by and/or inaudible to end users employing the CPE 60 and/or 90, but nevertheless detectable. For example, a suitable AWM may be achieved by encoding a low frequency, low intensity signal with some unique identifying data or low bit rate information. However, other suitable types of substantially hidden audio watermarking techniques as may be known in the art are also contemplated.

When the terminating half-call 82 reaches the gateway 64, the AWM sensor 68 analyzes and/or examines the same to detect the accompanying AWM. Accordingly, the terminating half-call 82 is recognized as corresponding to the originating half-call 80. Of course, it is to be appreciated that a plurality of various originating and terminating half-calls are likely being routed through the gateway 64 at any given time. For example, a call may be made from CPE (situated similar to CPE 60) to CPE 76, e.g., a regular or non-IP telephone, that is connected to the PSTN 70. Accordingly, the originating half-call from the IP network 62 passes through the IP gateway 64, but there is no corresponding terminating half-call that passes through IP gateway 64, rather the corresponding terminating half-call is routed over the PSTN 70 to the CPE 76. Likewise, for a call originating from the CPE 76 to CPE situated similar to CPE 90, the IP gateway 64 has a terminating half-call passing therethrough with no corresponding originating half-call passing therethrough. Furthermore, there may be numerous distinct calls having both their originating and terminating halves passing through the gateway 64. Nevertheless, the audio watermarking provides a way to distinguish the identity of originating and terminating half-calls passing through the gateway 64 that correspond to and/or are otherwise associated with one another.

Suitably, once the half-calls 80 and 82 are recognized as corresponding to one another, the solid arrow or packet-switched portions of the half-calls 80 and 82 are directly connected to one another. In essence, the PSTN 70 is bypassed by short circuiting the call at the IP gateway 64. Accordingly, the switch 72 is no longer involved in the call once the connection is completed. That is to say, the call routing path represented by the dashed arrow or circuit-switched portions of the half-calls 80 and 82 is no longer employed so as to relieve the switch 72 of having to support the call for its entire duration. Additionally, the load on the IP gateway is also lessened insomuch as the packet-switched portion of the first half-call 80 is connected directly with the packet-switched portion of the second half-call 82. That is to say, once the connection is completed, the IP gateway 64 no longer has to convert or translate the originating half-call 80 from a packet-switched call to a circuit-switched call, nor convert or translate the terminating half-call 82 back from a circuit-switched call to a packet-switched call. In fact, having connected the packet-switched portions of the half-calls 80 and 82 directly with one another, the IP gateway 64 is also optionally released from the call entirely, i.e., the call is optionally connected between the CPE 60 and CPE 90 over the IP network 62 without passing through the gateway 64. For example, one or both of the CPE involved in the call are optionally provided with the other's IP address, or the like, so that they may connect directly with one another over the IP network 62 (i.e., without passing through the gateway 64).

Figure 3:
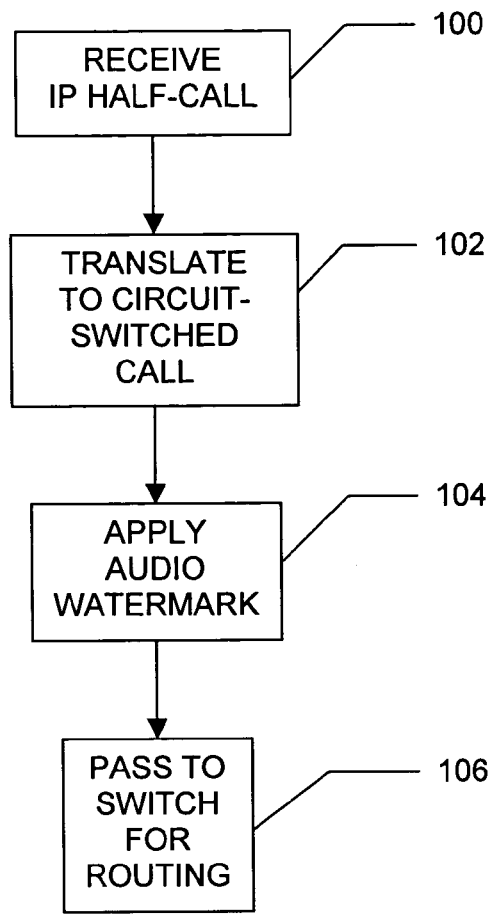
FIG. 3 is a flow chart showing a process for handling originating half-calls in accordance with an exemplary embodiment of the process.

With reference to FIG. 3, an exemplary process for handling originating half-calls within the IP gateway 64 is illustrated. At step 100, the gateway 64 receives an originating half-call from the IP network 62. At step 102, the received originating half-call is converted or translated into a circuit-switched call. At step 104, a uniquely identifying AWM is applied to the received half-call, e.g., via the AWM generator 66, and information or data corresponding to the applied AWM is stored, e.g., in an AWM DataBase (DB) 69 (see FIG. 2). Suitably, the AWM DB 69 relates each particular applied AWM to the respective half-call it identifies. At step 106, the audio watermarked half-call is directed to a circuit-switched telecommunications switch (e.g., the switch 72) for routing.

Figure 4:
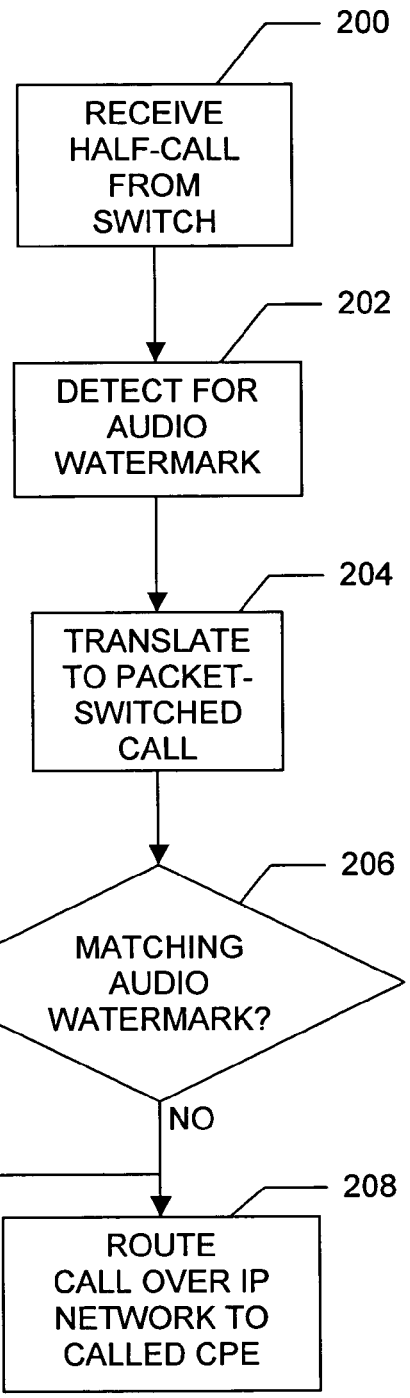
FIG. 4 is a flow chart showing a process for handling terminating half-calls in accordance with an exemplary embodiment of the process.

With reference to FIG. 4, an exemplary process for handling terminating half-calls within the IP gateway 64 is illustrated. At step 200, the gateway 64 receives a terminating half-call from the PSTN 70, e.g., via switch 72. At step 202, the received terminating half-call is analyzed and/or examined to detect and/or identify any accompanying AWM, e.g., via the AWM sensor 68. At step 204, the received half-call is converted or translated into a packet-switched call. At decision step 206, it is determined if the detected AWM (if any) from the received half-call matches a previously applied AWM. Suitably, if an AWM is detected, it is compared against those stored in the AWM DB 69 to determine if a match exists and/or to identify the other half-call to which the particular AWM was applied. If no match exists (including, if no AWM was detected), then the process continues to step 208 where the received terminating half-call is directed over the of the IP network 62 to the called CPE. On the other hand, if a match does exist, then a corresponding pair of half-calls has been recognized and the process continues to step 210 where the received terminating half-call is connected to the identified originating half-call having the matching AWM. Thereafter, the process continues to step 208 such that the identified originating half-call is connected over the IP network 62 to the called CPE (e.g., as represented by the solid arrow portions of half-calls 80 and 82).

With regard to FIGS. 2, 3 and 4, the application and detection of the AWM is shown and described above as occurring while the respective half-calls are in their circuit-switched states. However, the application and detection of the AWM is optionally carried out in a similar manner while the respective half-calls are in their packet-switched states. For example, steps 102 and 104 may be transposed and steps 202 and 204 may be transposed.

For simplicity and clarity, only a single switch 72 and a single gateway 64 have been shown in FIG. 2 and described above. It is to be appreciated, however, that a plurality of similarly situated network elements operating in like manner optionally exist within the system. Moreover, for some calls, the originating and terminating half-calls may be routed through different switches and/or gateways. For example, an originating half-call from a calling CPE may be directed over the IP network 62 to an originating gateway and on to an originating switch. However, due to the call's destination, it may then be routed over the PSTN 70 to a terminating switch (different than the originating switch) which directs a terminating half-call to a terminating IP gateway (also different than the originating gateway), and then over the IP network 62 to the called CPE. Suitably, in such instances, the originating gateway communicates to the terminating gateway the AWMs applied by the originating gateway and information regarding the half-calls they identify so that the terminating gateway upon detecting an AWM in a terminating half-call is able to establish the identity of the terminating half-call's corresponding originating half-call. For example, the AWM DB 69 is optionally maintained on a DB server or the like connected to the IP network 62 so as to be accessible to all the IP gateways in the system. Accordingly, the relevant information and/or data regarding any AWM applied by any originating gateway is stored therein so as to be accessible by any terminating gateway that detects an AWM. Accordingly, a corresponding originating and terminating half-call pair is recognizable regardless of whether or nor they are passing through the same gateway. Suitably, once they are so recognized, they are directly connected to one another within the IP network 62 thereby bypassing the PSTN 70 entirely and optionally bypassing one or both of the originating and terminating gateways.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. Within a telecommunications network, a method of processing half-calls each having opposing first and second ends, each of said half-calls being one of an originating half-call terminated at the first end thereof by calling consumer premises equipment and a terminating half-call terminated at the first end thereof by called consumer premises equipment, wherein an associated pair of half-calls connected at their second ends including both an originating and terminating half-call completes a call connecting the consumer premises equipment terminating the respective first ends of the half-calls that form the pair, said method comprising:

(a) applying identifiers comprising audio watermarks to originating half-calls such that the originating half-calls are distinctly identifiable thereby with respect to one another, said identifiers thereafter accompanying terminating half-calls that form associated pairs of half-calls together with the originating half-calls to which the identifiers were applied; and
   (b) examining terminating half-calls to detect the identifiers such that upon detection of the identifiers the terminating half-calls accompanying the detected identifiers and the originating half-calls to which the identifiers were applied are recognized as associated pairs of half-calls.

2. The method of claim 1, further comprising:

prior to step (a), receiving the originating half-calls from the calling consumer premises equipment over a packet-switched network;
   translating the received originating half-calls from a packet-switched call format to a circuit-switched call format such that each originating half-call defines an originating half-call routing path having a packet-switched portion and a circuit-switched portion;
   after step (a), directing the received originating half-calls to a circuit-switched network for routing;
   prior to step (b), receiving the terminating half-calls from the circuit-switched network;
   translating the received terminating half-calls from the circuit-switch call format to the packet-switched call format such that each terminating half-call defines a terminating half-call routing path having a packet-switched portion and a circuit-switched portion; and,
   after step (b), directing the received terminating half-calls to the called consumer premises equipment over the packet-switched network.

3. The method of claims 2, wherein upon recognizing associated pairs of half-calls, the respective second ends of the half-calls forming each pair are connected to one another so as to reduce the originating and terminating half-call routing paths defined thereby to only their packet-switched portions.

4. The method of claim 2, wherein upon recognizing associated pairs of half-calls, the respective second ends of the half-calls forming each pair are connected to one another so as to eliminate the circuit-switched portions from the originating and terminating half-call routing paths defined thereby.

5. The method of claim 1, wherein step (a) comprises:

superimposing the audio watermarks on traffic being delivered via the originating half-calls.

6. The method of claim 5, wherein the audio watermarks are substantially unperceivable by end users employing the consumer premises equipment.

7. Within a telecommunications network, a call processing apparatus for processing half-calls each having opposing first and second ends, each of said half-calls being one of an originating half-call terminated at the first end thereof by calling consumer premises equipment and a terminating half-call terminated at the first end thereof by called consumer premises equipment, wherein an associated pair of half-calls connected at their second ends including both an originating and terminating half-call completes a call connecting the consumer premises equipment terminating the respective first ends of the half-calls that form the pair, said call processing apparatus comprising:

application means for applying identifiers comprising audio watermarks to originating half-calls such that the originating half-calls are distinctly identifiable thereby with respect to one another, said identifiers thereafter accompanying terminating half-calls that form associated pairs of half-calls together with the originating half-calls to which the identifiers were applied; and,
   examination means for examining terminating half-calls to detect the identifiers such that upon detection of the identifiers the terminating half-calls accompanying the detected identifiers and the originating half-calls to which the identifiers were applied are recognized as associated pairs of half-calls.

8. The call processing apparatus of claim 7, further comprising:

translation means for:
   (i) receiving the originating half-calls from the calling consumer premises equipment over a packet-switched network;
   (ii) translating the received originating half-calls from a packet-switched call format to a circuit-switched call format such that each originating half-call defines an originating half-call routing path having a packet-switched portion and a circuit-switched portion;
   (iii) directing the translated originating half-calls to a circuit-switched network for routing;
   (iv) receiving the terminating half-calls from the circuit-switched network;
   (v) translating the received terminating half-calls from the circuit-switch call format to the packet-switched call format such that each terminating half-call defines a terminating half-call routing path having a packet-switched portion and a circuit-switched portion; and,
   (vi) directing the translated terminating half-calls to the called consumer premises equipment over the packet-switched network.

9. The call processing apparatus of claim 8, wherein the translation means comprises a gateway bridging the packet-switched network with the circuit-switched network.

10. The call processing apparatus of claim 8, further comprising:

connection means for connecting half-calls recognized as associated pairs such that the respective second ends of the half-calls forming each pair are connected to one another so as to reduce the originating and terminating half-call routing paths defined thereby to only their packet-switched portion.

11. The call processing apparatus of claim 8, further comprising:
connection means for connecting half-calls recognized as associated pairs such that the respective second ends of the half-calls forming each pair are connected to one another so as to eliminate the circuit-switched portions from the originating and terminating half-call routing paths defined thereby.

12. The call processing apparatus of claim 7, wherein, said audio watermarks comprise distinctly encoded signals applied to the originating half-calls by the application means.

13. The call processing apparatus of claim 7, wherein the application means superimposes the audio watermarks on traffic being delivered via the originating half-calls.

14. The call processing apparatus of claim 7, wherein the audio watermarks are substantially unperceivable by end users employing the consumer premises equipment.

15. In a telecommunications network including a packet-switched network and a circuit-switched network, a gateway that bridges the packet-switched and circuit-switched networks with one another by selectively converting packet-switched calls into circuit-switched calls and vice versa depending on a direction of traffic flow over the gateway, the gateway operative to process call legs each having opposing first and second ends, each of said call legs being one of an originating call leg terminated at the first end thereof by calling consumer premises equipment and a terminating call leg terminated at the first end thereof by called consumer premises equipment, wherein an associated pair of call legs connected at their second ends including both an originating and terminating call leg completes a call connecting the consumer premises equipment terminating the respective first ends of the call legs that form the pair, said gateway comprising:
an audio watermark generator that applies identifiers comprising audio watermarks to a first leg of calls routed through the gateway, said identifiers distinctly identifying the respective calls to which they are applied from one another, said identifiers thereafter accompanying second legs of calls that form associated pairs of call legs together with the first legs of calls to which the identifiers were applied; and,
an audio watermark sensor that examines a second leg of calls routed through the gateway to detect for audio water mark identifiers such that upon detection of the identifiers respective second leg of calls accompanying the detected identifiers and the respective first call legs to which the identifiers were applied are recognized as associated pairs of call legs.

16. The gateway of claim 15, wherein the gateway connects to the circuit-switched network through a circuit-switched telecommunications switch.

17. The gateway of claim 16, wherein an interface is arranged between the gateway and the switch thereby operatively connecting them to one another such that from the perspective of the switch the gateway appears to behave as a remote digital terminal.

18. The gateway of claim 17, wherein the switch is a class five switch.

19. The gateway of claim 18, wherein the interface is a GR-303 interface.

20. The gateway of claim 18, wherein the interface is a V.5.2 interface.

* * * * *